United States Patent [19]

Paz-Pujalt

[11] Patent Number: 5,271,956
[45] Date of Patent: * Dec. 21, 1993

[54] METHOD OF FORMING TERNARY METAL FLUORIDE FILMS BY THE DECOMPOSITION OF METALLO-ORGANIC COMPOUNDS IN THE PRESENCE OF A FLUORINATING AGENT

[75] Inventor: Gustavo R. Paz-Pujalt, Rochester, N.Y.

[73] Assignee: Eastman Kodak Company, Rochester, N.Y.

[*] Notice: The portion of the term of this patent subsequent to Sep. 24, 2008 has been disclaimed.

[21] Appl. No.: 814,530

[22] Filed: Dec. 30, 1991

[51] Int. Cl.$^5$ .............................................. B05D 5/12
[52] U.S. Cl. ................................... 427/108; 427/100; 427/126.1; 427/162; 427/164; 427/165; 427/226; 427/229; 427/240; 427/430.1
[58] Field of Search ............... 427/108, 164, 165, 162, 427/226, 128, 100, 126.1, 240, 430.1, 229

[56] References Cited

U.S. PATENT DOCUMENTS

| | | | |
|---|---|---|---|
| 3,663,280 | 5/1972 | Lee | 427/229 |
| 4,399,090 | 8/1983 | Sprangers et al. | 427/226 |
| 4,906,493 | 3/1990 | Laine | 427/226 |
| 5,073,410 | 12/1991 | Paz-Pujalt | 427/226 |
| 5,085,888 | 2/1992 | Morimoto et al. | 427/226 |
| 5,116,643 | 5/1992 | Miller et al. | 427/226 |

*Primary Examiner*—Janyce Bell
*Attorney, Agent, or Firm*—Raymond L. Owens

[57] ABSTRACT

A process is disclosed of forming a film of a ternary metal fluoride in which there is combined a solvent solution, a mixture of metallo-organic compounds, and an organic fluoride to form a casting liquid. The casting liquid is then coated by a method such as dip coating or spin coating to form a coating on a substrate. The coated substrate is then heated to decompose the metallo-organic compounds and organic fluoride resulting in recovery of a ternary metal fluoride coated substrate. The ternary metal fluorides formed are fluorides of at least one alkaine earth metal and at least one fourth period divalent transition metal having an atomic number of from 22 to 30 inclusive.

16 Claims, No Drawings

1

METHOD OF FORMING TERNARY METAL FLUORIDE FILMS BY THE DECOMPOSITION OF METALLO-ORGANIC COMPOUNDS IN THE PRESENCE OF A FLUORINATING AGENT

FIELD OF THE INVENTION

The invention relates to a method of providing a layer of metal fluoride or metal oxyfluoride on a substrate. It particularly relates to the formation of a fluorinated metal layer by decomposition of metallo-organic compounds such as metal carboxylates in the presence of a fluorinating agent.

BACKGROUND

Ternary metal fluoride films consisting of fluoride, alkaline earth metal and a fourth period transition metal (e.g., elements 22 to 30 of the periodic table of elements) have been the subject of intense interest because of their electrical, magnetic and optical properties. In addition to basic advantages, such as relatively low refractive indices, low dielectric constants, high levels of optical transparency and excellent mechanical properties, ternary metal fluoride films have drawn interest for a variety of other properties, such as piezoelectric, ferromagnetic or antiferromagnetic, electro-optic, pyroelectric and nonlinear optical properties. An illustration of the known utility of ternary metal fluorides is provided by Bergman, Jr. et al U.S. Pat. No. 3,982,136.

A method of providing metal fluoride layers is described in U.S. Pat. No. 3,475,192-Langley. In this method the substrate is coated with a solution of magnesium fluoride in a polar organic solvent, after which the substrate is heated to a temperature between 100° and 1000° C., preferably between 400° and 800° C. In this method it is necessary to add a film forming vehicle to the solution so as to obtain a layer of an optically good quality. Said film forming vehicle must be fired in the thermal treatment for which a temperature between 400° and 800° C. may haze the magnesium fluoride layer formed.

It has been proposed in U.S. Pat. No. 4,492,721-Joosten et al that magnesium fluoride layers be formed by decomposition of fluorinated organic magnesium compounds such as magnesium trifluoroacetate. However, the preparation of fluorinated metal salts is difficult and therefore the materials for the Joosten et al method are expensive. Furthermore, magnesium trifluoroacetate is toxic and its inhalation may result in severe injury. Further, the method is not believed generally suitable for the preparation of ternary metal fluoride layers.

Paz-Pujalt U.S. Pat. No. 5,051,278 discloses a method of forming a film of metal fluoride comprising combining a non-fluorine-containing metallo-organic compound, solvent and a fluorinating agent to form a casting liquid, forming a coating of the casting liquid on a substrate, and heating the coating and the substrate, wherein the metal of the metallo-oganic compound comprises at least one of lithium, sodium, potassium, magnesium, calcium, strontium, barium, yttrium, europium and other rare earths.

Vacuum vapor deposition processes of forming metal fluoride layers are unattractive for forming ternary metal fluoride layers, since there is no asssurance of uniformly attaining the intended stoichiometry of the metals in the layers. Vacuum vapor deposition also places constraints on coating environments and substrate forms.

SUMMARY OF THE INVENTION

In one aspect, this invention is directed to a process of forming a ternary metal fluoride satisfying the formula:

$$M^1 M^2 F_4$$

where
$M^1$ is at least one alkaline earth metal and
$M^2$ is at least one fourth period divalent transition metal having an atomic number of from 22 to 30 inclusive, comprising (a) combining non-fluorine-containing metallo-organic compounds of each of $M^1$ and $M^2$, a solvent, and fluorinating agent to form a casting liquid, (b) forming a coating of the casting liquid on a substrate, and (c) thermally decomposing the fluorinating agent and the metallo-organic compounds to form the ternary metal fluoride as a coating on the substrate.

The invention has numerous advantages over prior practices. The vapor deposition technique requires high temperatures for vaporization of the metal fluoride, expensive containers for vapor deposition, such as tantalum boats. Further, utilizing vapor deposition it is difficult to form mixtures with a given stoichiometry of different vapor deposited metals. A process such as Joosten et al has a disadvantage that fluorinated metal salts must first be formed and then deposited prior to decomposition and formation of the magnesium fluoride. The Joosten et al technique is expensive in that the magnesium salts are expensive and difficult to synthesize, and magnesium trifluoroacetate is extremely toxic and, therefore, the technique is not suitable for a wide range of different metal fluorides or for mixtures of metals forming mixed metal fluoride coatings.

Coating by dip coating or spin coating as in the invention allows the coating of irregular shapes that do not coat well with vapor deposition. These and other advantages will be apparent from the following detailed description.

DESCRIPTION OF THE PREFERRED EMBODIMENTS

The process of the invention is applicable forming ternary metal fluoride layers on a broad range of substrates of varied shapes and compositions. Any substrate can be employed that is capable of withstanding the temperatures employed for thermally decomposing the metallo-organic compounds used to form the ternary metal fluoride layers. Preferred substrates are those that are capable of withstanding temperatures of at least 500° C. The specific choice of substrate depends upon the specific utility contemplated. For example, if the ternary metal fluoride layer is intended to function as a ferromagnetic memory unit, the substrate surface provided for coating is at least in part provided by a metal capable of resisting oxidation at decompositon temperatures. The metal can take the form of an underlying electrode. Relatively stable metals, such as platinum metals (e.g., platinum or palladium), gold, silver and austenitic steel are useful. Usually the metal that forms the underlying electrode will itself be coated on a thermally stable substrate, such as a glass or ceramic substrate. It is specifically contemplated to form a ferromagnetic memory unit on the surface of an integrated chip or wafer. For example, a monocrystalline or polycrystalline silicon or III-V compound substrate, which can take the form of a laser, photodiode, rectifier, transistor or integrated circuit, can be overcoated with a metal pattern to provide the underlying electrode or electrodes of a ferromagnetic memory unit, with the ternary metal fluoride layer being formed on this composite substrate. On the other hand, if the ternary metal fluoride layer is intended to function as an electro-optic waveguide (e.g., a linear or nonlinear waveguide) the substrate is chosen based on the known criteria of optical transparency and relative refractive index. Thus, the ternary metal fluoride in this instance can advantageously be coated on a glass surface. Again, the glass surface can itself be part of a layer coated on a substrate. For example, the ternary metal fluoride layer can take the form of a layer overlying a glass layer which in turn overlies a semiconductor substrate of any of the various types noted above.

The ternary metal fluorides contemplated to be prepared by the process of the invention include those represented by the formula:

$$M^1M^2F_4$$

where
   $M^1$ is at least one alkaline earth metal and
   $M^2$ is at least one fourth period divalent transition metal having an atomic number of from 22 to 30 inclusive.

Preferred alkaline earth metals include magnesium, calcium, strontium, barium and mixtures thereof. The fourth period transition metals contemplated include vanadium, chromium, manganese, iron, cobalt, nickel, copper, zinc and mixtures thereof. While the ternary metal fluorides as a class exhibit desirable basic optical and mechanical properties, such as transparency and uniform layer forming properties, for specific applications different selections of metals are contemplated. For example, as taught by Bergman, Jr. et al, cited above, preferred ferromagnetic layers preferably employ barium as an alkaline earth metal and zinc, nickel, cobalt, copper, iron or manganese as a transition metal.

One of the distinct advantages of the present invention is that the desired stoichiometric ratio of alkaline earth and transition metals sought in the trenary metal fluoride layer to be produced is assured merely by mixing metallo-organic compounds of the metals in the desired ratios in the process of the invention.

The organic components of the organo-metallic compounds can be selected and further acted on in the process as taught by Paz-Pujalt U.S. Pat. No. 5,051,278, the disclosure of which is here incorporated by reference.

Pure metal carboxylates decompose to give the metal carbonate which subsequently decomposes into the metal oxide, and the corresponding ketone which decomposes following a mechanism suitable to its own properties. Meanwhile, fluorinated carboxylates give upon heating, a mixture of fluorocarbons such as $C_3F_7CFO$, $C_2F_6$, $(C_3F_7CO)_2O$, and COF; and further pyrolysis of these gives HF, $F_2$, and $CHF_3$. The formation of metal fluorides is thought to occur as a result of the reaction of the HF, $F_2$, and $CHF_3$ fluorinating agents, which are produced in situ, with the decomposition products of metal carboxylates and fluorocarboxylates:

$$M(O_2CR)_2 \longrightarrow MCO_3 \longrightarrow MO$$

$$\begin{array}{c}MCO_3\\ \text{or}\\ MO\end{array} \xrightarrow{\text{Fluorinating agent}} MF_2$$

The fluorinating agent coordinates to the metal in question so as to remain in the reaction region at temperatures beyond the boiling point where fluorine-containing pyrolysis products are given off.

The invention is generally performed by dissolving non-fluorine-containing metallo-organic compound in a solvent and adding a fluorinating agent, such as fluorinated carboxylic acid, to the solvent solution. Typically the organic fluoride is a liquid however it is possible that the organic fluoride may be dissolved in the same or a different solvent than the non-fluorine-containing metallo- organic compound prior to mixing with the metal precursor solution. The solvent metal carboxylate solution and organic fluoride are mixed to obtain a casting liquid. The casting liquid is coated onto a suitable substrate by any conventional method such as spin coating, dip coating, or spray coating. The coating and substrate are then heated to decompose the metal carboxylate and organic fluoride to form a metal fluoride coat on the substrate.

The process may be performed with any non-fluorine-containing metallo-organic compound that upon thermal decomposition results in formation of an inorganic form of the metal that is a metallic state metal, metal oxide, or metal carbonate. Suitable non-fluorine-containing metallo-organic compounds include metal carboxylates, metal alkoxides, and metal acetylacetonates all mixed with acid such that rheology is adjusted. The term "metallo-organic" as used here means metal in combination with organic ligands.

The alkaline earth carboxylates were recognized by Paz-Pujalt to form metal fluorides. It was expected that the transition metal carboxylates because of their more intermediate electropositivity, would produce metal fluorides nixed with the metal oxy fluorides in the product obtained; however, this has not been observed in forming the ternary metal fluorides herein contemplated.

Any organic fluorinating agent may be utilized that when mixed with the solvent solution of metallo-organic non-fluorine-containing metal compound stays in solution without a disruptive reaction, and when heated on a substrate gives off fluorinated gases that result in the formation of metal fluoride. Suitable fluorinating agents are trifluoroacetylacetone, heptafluoroacetylacetone, alkanoyl fluorides, fluoroalkanoic and generally any of the fluoro compounds that upon decomposition or pyrolysis produce fluorine substituted alcohols, hydrocarbons, metal carboxylates, and alkoxides that upon further decomposition or pyrolysis produce fluorine, hydrogen fluoride, and $COF_2$. Preferred fluorinating agents are fluorinated carboxylic acids such as fluorobutyric acid. Fluorobutyric acid is particularly preferred as it is low in cost and readily available. The fluorinated carboxylic compounds preferred to be utilized in the invention decompose upon heating to hydrogen fluoride gas, fluorine gas and $COF_2$ gas. These fluorine-containing gaseous materials react with the preferred metal carboxylate or other non-fluorine-containing metallo-organic compound to produce the metal fluoride during heating.

The heating of the substrate onto which the casting liquid is cast generally is to about 500° C. for decomposition of the products to result in the purest ternary metal fluoride. The substrate containing the casting liquid may be heated at any suitable rate. A preferred rate is about 50° C. per minute for uniform coats of the metal fluoride film.

The solvent, to dissolve the non-fluorine-containing metallo-organic compound, may be any material that does not react with the metallo-organic compound or the fluorinating agent in a disruptive manner, i.e., gelling, forming precipitates, or separating. Typical of such solvents are benzene, toluene, butanol, 2-ethylhexanoic, and neodecanoic. A preferred solvent for the preferred metallo-organic carboxylates is toluene, as it is low in cost and offers desirable coating advantages due to its surface tension and viscosity of casting liquids formed. The solvent utilized must be able to dissolve the metal carboxylates such as resinates, 2-ethylhexanoates, neodecanoates, as well as the alkoxides and acetylacetonates.

The coating technique utilized to form a layer of the casting liquid may be anything that will give a thin coat on a particular substrate. These include spraying, doctor blade coating, and curtain coating. Preferred methods are spin coating and dip coating. In spin coating a liquid is applied to a substrate which is then spun at a high rate of rpms such as 6000 rpm. In dip coating the substrate is dipped into liquid and allowed to drain prior to heating. Spin coating results in very uniform thin coatings.

The following examples are intended to be illustrative and not exhaustive of techniques in accordance with the invention. Parts and percentages are by weight unless otherwise indicated.

Calcium Carboxylate 10 g $CaCo_3$

Excess 2-ethylhexanoic, heat with stirring at reflux conditions for 18 h. After filtration thermogravimetric analysis (TGA) showed 4.58% CaO residue at 700° C.

Magnesium Carboxylate 2.35 g MgO
15.8 g 2-Ethylhexanoic
30 ml Toluene

A slurry of MgO/toluene is added slowly to the warmed up (about 100° C.) acid with stirring. After filtration and TGA a residue of 2.99% MgO is found.

Barium Carboxylate (1)

Obtained commercially as Ba-Resinate from Engelhard TM (a carboxylate of a naturally occurring acid).

Barium Carboxylate (2)

11.6 g Barium hydroxide, ACS Reagent Grade
15.6 g 2-ethylhexanoic acid (excess)
60 g toluene The acid was mixed with 30 g of toluene and heated to reflux. The rest of the toluene was then mixed with the barium hydroxide and warmed up while trying to grind the hydroxide particles. The resulting composition was added slowly to the solvent acid mixture. After there was no further evidence of large particles of unreacted hydroxide, the comosition was filtered while hot and solvent was then removed to achieve the desired concentration. Analysis showed 12.19% Ba.

Barium cobalt fluoride precursor 0.111 g Cobalt cyclohexanebutyrate
0.318 g Ba-precursor (2)
1.1 g 2-Ethylhexanoic acid
0.5 g Heptafluorobutyric acid The barium and cobalt precursors wee mixed in the acid and heated until the cobalt precursor dissolved. The cooled solution was a purple precursor material. The fluorinating agent was then added with gentle heating.

Formation of barium cobalt fluoride

A portion of the barium cobalt fluoride ($BaCoF_4$) precursor was decomposed in a crucible on a hot stage. The resultant powder was analyzed by X-ray diffraction (XRD) and determined to be $BaCoF_4$ by comparison with Joint Committee on Powdered Diffraction Standards (JCPDS) file 21,65.

The invention has been described in detail with particular reference to preferred embodiments thereof, but it will be understood that variations and modifications can be effected within the spirit and scope of the invention.

What is claimed is:

1. A process of forming a ternary metal fluoride satisfying the formula:

$$M^1M^2F_4$$

where
  $M^1$ is at least one alkaline earth metal and
  $M^2$ is at least one fourth period divalent transition metal having an atomic number of from 22 to 30 inclusive, comprising
    combining non-fluorine-containing metallo-organic compounds of each of $M^1$ and $M^2$, a solvent, and fluorinating agent to form a casting liquid,
    forming a coating of the casting liquid on a substrate, and
    thermally decomposing the fluorinating agent and the metallo-organic compounds to form the ternary metal fluoride as a coating on the substrate.

2. A process according to claim 1 wherein the fluorinating agent is comprised of a fluorinated carboxylic acid.

3. A process according to claim 2 wherein the fluorinated carboxylic acid is fluorobutyric acid.

4. A process according to claim 1 wherein the fluorinating agent is comprised of at least one of trifluoroacetylacetone, heptafluoroacetylacetone, fluoroacetic acid, boron trifluoride, alkanoyl fluoride and fluoroalkanoic anhydride.

5. A process according to claim 1 wherein the casting liquid is spin coated on the substrate.

6. A process according to claim 1 wherein the substrate is dip coated by the casting liquid.

7. A process according to claim 1 wherein the coating is heated to a temperature of at least 500° C. in forming the ternary metal fluoride.

8. A process according to claim 1 wherein the substrate presents a glass surface for coating.

9. A process according to claim 1 wherein the substrate presents a metal surface for coating.

10. A process according to claim 1 wherein the substrate is comprised of a semiconductor.

11. A process according to claim 1 wherein the semiconductor is silicon or a III-V compound.

12. A process according to claim 1 wherein the metallo-orgranic compound is slected from among metal carboxylates, metal alkoxides, metal acetylacetonates and mixtures thereof.

13. A process according to claim 1 wherein the alkaline earth metal is at least one of magnesium, calcium, strontium and barium.

14. A process according to claim 13 wherein the alkaline earth metal is comprised of barium.

15. A process according to claim 1 wherein the divalent transition metal is at least one of manganese, iron, cobalt, nickel and zinc.

16. A process of forming a ternary metal fluoride satisfying the formula:

$$BaM^2F_4$$

where
$M^2$ is selected from the group consisting of manganese, iron, cobalt, nickel and zinc, comprising
combining non-fluorine-containing metallo-organic compounds of each of Ba and $M^2$, a solvent, and fluorinating agent to form a casting liquid,
forming a coating of the casting liquid on a substrate, and
thermally decomposing the fluorinating agent and the metallo-organic compounds to form the ternary metal fluoride as a coating on the substrate.

* * * * *